(12) United States Patent
De Andrade Barbosa et al.

(10) Patent No.: US 9,015,033 B2
(45) Date of Patent: Apr. 21, 2015

(54) METHOD AND APPARATUS FOR DETECTING A SENTIMENT OF SHORT MESSAGES

(75) Inventors: Luciano De Andrade Barbosa, Madison, NJ (US); Junlan Feng, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 685 days.

(21) Appl. No.: 12/911,856

(22) Filed: Oct. 26, 2010

(65) Prior Publication Data

US 2012/0101805 A1    Apr. 26, 2012

(51) Int. Cl.
*G06F 17/27* (2006.01)

(52) U.S. Cl.
CPC ..................................... *G06F 17/27* (2013.01)

(58) Field of Classification Search
USPC ........................................ 704/1, 2, 4, 7, 10, 9
See application file for complete search history.

(56) References Cited

U.S. PATENT DOCUMENTS

| | | | |
|---|---|---|---|
| 2008/0249764 A1* | 10/2008 | Huang et al. | 704/9 |
| 2009/0164417 A1* | 6/2009 | Nigam et al. | 707/2 |
| 2010/0082751 A1* | 4/2010 | Meijer et al. | 709/206 |
| 2011/0208522 A1* | 8/2011 | Pereg et al. | 704/235 |

* cited by examiner

*Primary Examiner* — Qi Han

(57) ABSTRACT

A method, computer readable medium and apparatus for detecting a sentiment for a short message are disclosed. For example, the method receives the short message, and obtains an abstraction of the short message. The method then determines the sentiment of the short message based upon the abstraction.

10 Claims, 4 Drawing Sheets

METHOD AND APPARATUS FOR DETECTING A SENTIMENT OF SHORT MESSAGES

The present disclosure relates generally to a method and apparatus for performing sentiment detection and, more particularly, to a method and apparatus for detecting a sentiment in a short message.

BACKGROUND

Short messaging has become very popular over the past few years. Many of these messages contain information or opinions that can be very valuable to companies. As a result, methods are being developed to try and identify various characteristics of these short messages.

One particular characteristic of interest is a sentiment of a short message. Current methods for detecting sentiments of text are not sufficient to detect sentiments of very short messages. Most of the current approaches use the raw word representation (or n-grams) as features to build a model for sentiment detection and perform this task over large pieces of text. In addition, these approaches may be heavily biased towards particular words when looking at the raw words of the text and provide noisy data that is not accurate. However, these techniques are not able to perform accurate sentiment detection on short messages because there is not enough information in these short messages to rely on.

SUMMARY

In one embodiment, the present disclosure teaches a method, computer readable medium and apparatus for detecting a sentiment for a short message. In one embodiment, the method receives the short message, and obtains an abstraction of the short message. The method then determines the sentiment of the short message based upon the abstraction.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
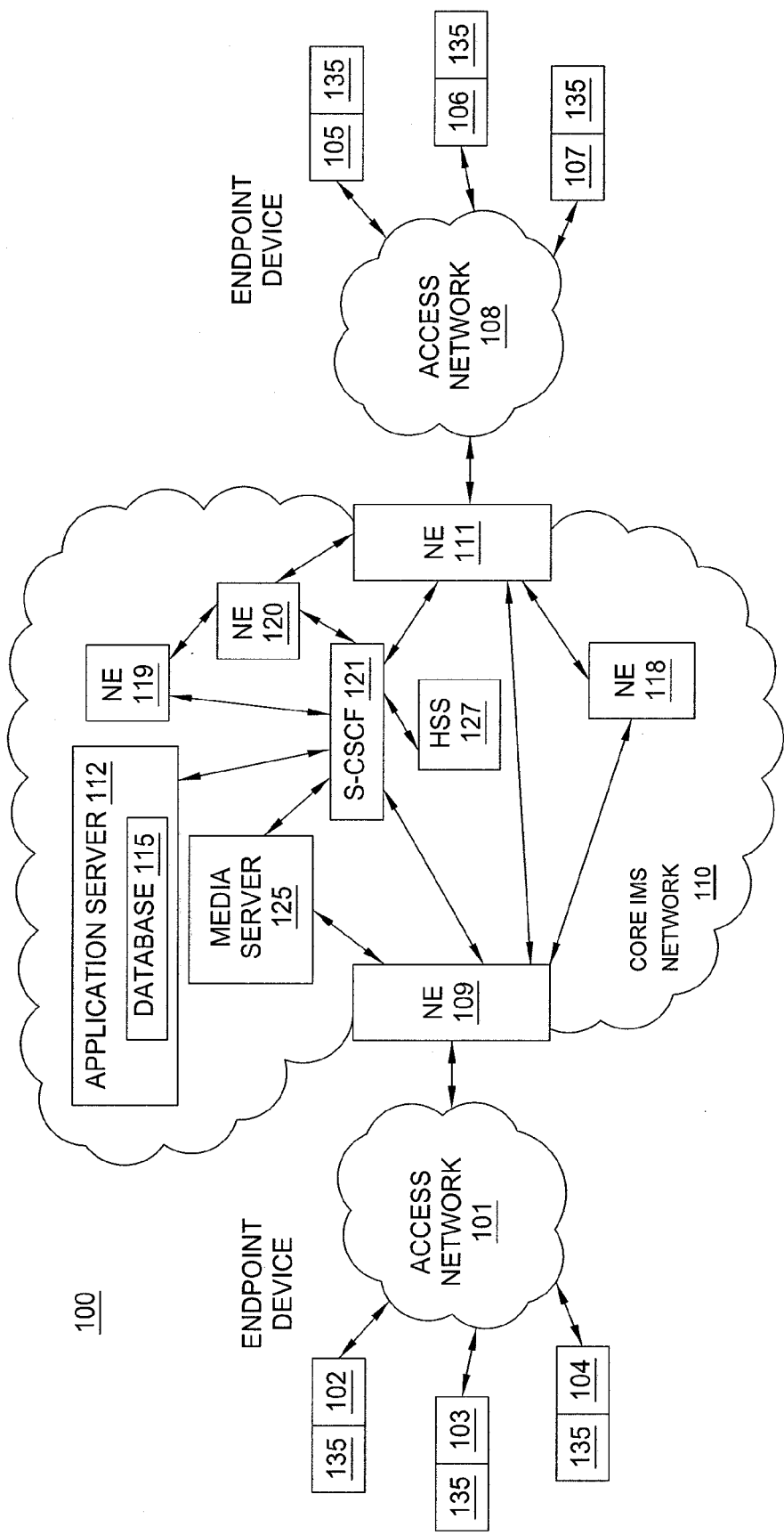
FIG. 1 illustrates one example of a communications network.

The present disclosure broadly discloses a method, computer readable medium and an apparatus for detecting a sentiment of short messages, e.g., tweets or Short Message Service (SMS) text messages and the like. FIG. 1 is a block diagram depicting one example of a communications network 100, e.g., an IP network such as an Internet Protocol (IP) Multimedia Subsystem (IMS) network related to the current disclosure. It should be noted that an IP network is broadly defined as a network that uses Internet Protocol to exchange data packets. Additional exemplary Internet protocol (IP) networks include Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. In addition, a plurality of endpoint devices 105-107 is configured for communication with the IMS core packet network 110 via an access network 108. The network elements 109 and 111 may serve as gateway servers or edge routers for the network 110.

In one embodiment, the endpoint devices 102-107 may comprise mobile customer endpoint devices such as wireless telephones, smart phones, laptop computers, Personal Digital Assistants (PDAs), and the like. Each one of the endpoint devices 102-107 may be coupled to a location tracking device 135. For example, the location tracking device may be a GPS transmitter or a simply a transmitter that emits a signal that can be used by the network 100 for triangulating the location. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a cellular access network, a $3^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a media server 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF 121 may also interrogate an HSS 127 to retrieve authorization, service information, user profiles, etc. In order to complete a call that requires certain service specific features, the S-CSCF 121 may need to interact with various application servers (e.g. various VoIP servers). For example, the S-CSCF 121 may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server 125 also interacts with customers for media session management to accomplish tasks such as process requests.

The application server (AS) 112 may comprise any server or computer, and the database 115 may be any type of electronic collection of data. In one embodiment, the AS 112 may store one or more dictionaries, machine learning tools and/or algorithms used by the present disclosure, as discussed below. In addition, one or more AS 112 may be included in the communication system 100. It should be recognized that the communication system 100 may be expanded by including additional endpoint devices, access networks, network elements, application servers, etc. without altering the scope of the present disclosure.

The above IP network is described to provide an illustrative environment in which packets for voice, data and multimedia services are transmitted on networks. The current disclosure discloses a method and apparatus for detecting a sentiment of short messages that are sent using an example network illustrated in FIG. 1 and as described above.

Figure 2:
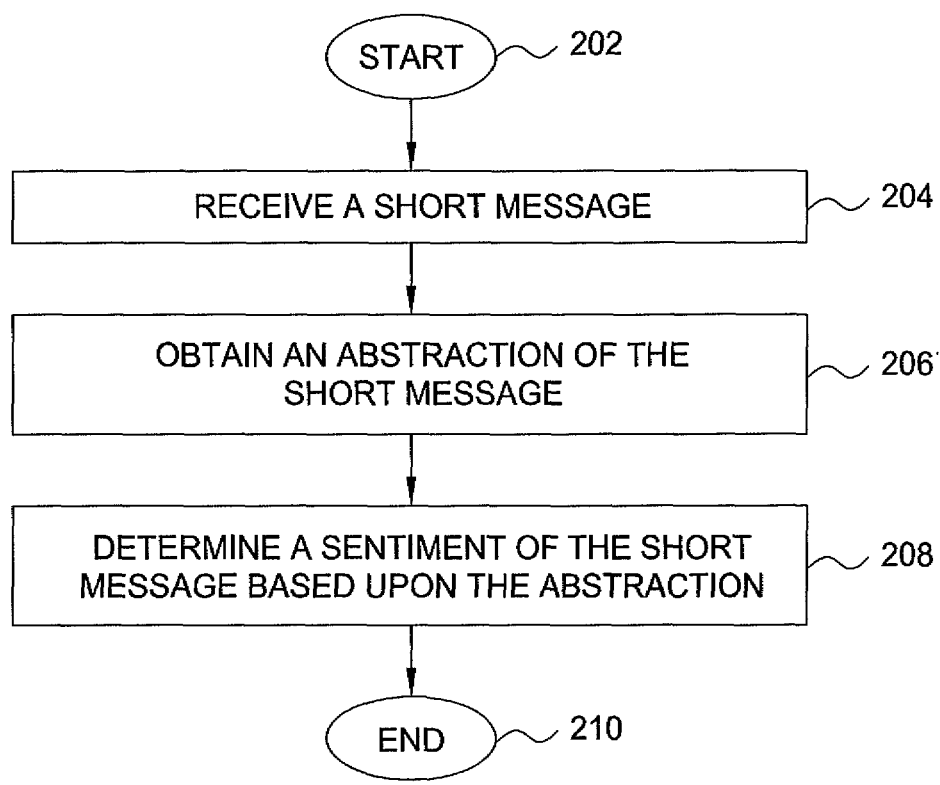
FIG. 2 illustrates an example flowchart for a method for detecting a sentiment of a short message.

FIG. 2 illustrates a high level flowchart of a method 200 for detecting a sentiment of one or more short messages. In one embodiment, the method 200 is implemented by the AS 112 or a general purpose computer having a processor, a memory and input/output devices as discussed below with reference to FIG. 4.

The method 200 begins at step 202 and proceeds to step 204. At step 204, the method 200 receives a short message. In one illustrative embodiment, a short message is defined as a message having less than 140 alpha numeric or ASCI based characters. For example, the messages may be "tweets" that are commonly found on social networking websites such as TWITTER® or other types of short messages found on other social network websites such as FACEBOOK® or SMS text messages and the like.

At step 206, the method 200 obtains an abstraction of the short message. An abstraction can be defined as translating the short message into one or more features associated with the short message. That is, the short message is represented by one or more features. For example, features of the short message may include meta-features and syntax features. In one embodiment, meta-features may include, parts-of-speech (e.g., verbs, adjectives, etc.), prior subjectivity decision (e.g., a decision that a word is considered to be "subjective" or "objective") and prior polarity (e.g., a decision that a word is considered to be "positive", "negative", and/or "neutral").

Broadly, subjectivity pertains to whether something (e.g. the short message) is subjective. For example, a short message "I love AT&T! ☺" may be considered subjective because it expresses a personal opinion as opposed to a short message "The book was delivered today." that may be considered objective because it expresses a fact. As will be discussed below, a sentiment model created by training a machine learning tool will be able to classify a subjectivity of a short message based upon the abstraction by analyzing the features or pattern of features.

Broadly, polarity pertains to a measure of a sentiment, e.g., a positive sentiment, a negative sentiment, and/or a neutral sentiment. It should be noted that there are many ways to express various degrees of sentiments in addition to "positive", "negative", and "neutral", e.g., "favorable", "unfavorable", "for", "against", "do not care", and so on. As will be discussed below, a sentiment model created by training a machine learning tool will be able to determine a polarity of a short message based upon the abstraction by analyzing the features or pattern of features.

In one embodiment, syntax features may include, for example, are tweets, hashtags, replies, links, punctuation, emoticons (e.g., textual expression representing facial expressions) and upper cases (e.g., the number of words that start with upper case or words in all caps). For example, the short message "AT&T is awesome! ☺" may be translated into an abstraction represented by three meta features (e.g., 1 noun, 1 verb and 1 adjective) and two syntax features (e.g. 1 punctuation and 1 emoticon).

The abstraction of the short message can be obtained using one or more dictionaries that are currently available. For example, currently various dictionaries are available such as polarity dictionaries, parts-of-speech dictionaries, punctuation dictionaries and the like. These dictionaries are applied to the short message to translate the short messages into the one or more features of the short message. In one embodiment, the abstraction may be performed by the application server 112 illustrated in FIG. 1 or a processor 402 of a general purpose computer 400 illustrated in FIG. 4.

At step 208, the method 200 obtains a sentiment of the short message based upon the abstraction. In one embodiment, the sentiment is obtained by providing the abstraction of the short message to a machine learning tool. For example, the machine learning tool may be a Waikato Environment for Knowledge Analysis (WEKA)-model and the like.

In one embodiment, the machine learning tool is trained to generate a model that determines a sentiment of a short message based upon the abstraction. For example, a large sample of abstractions of short messages with predetermined subjectivity classifications and sentiments is used to train the machine learning tool. The machine learning tool may "learn" which abstractions are subjective and lead to which sentiments based upon the large sample.

As a result, when abstractions are subsequently fed to the machine learning tool after the model has been generated, the machine learning tool will be able to provide a sentiment of the short messages based upon the abstraction. Using the above short message "AT&T is awesome! ☺" as an example, the abstraction fed to the machine learning tool would comprise three meta features (e.g., 1 noun, 1 verb and 1 adjective) and two syntax features (e.g., 1 punctuation and 1 emoticon). Based upon the training, the created sentiment model would identify that the message is subjective.

For example, the machine learning tool may be trained to know that pattern of features including a noun followed by a verb followed by an adjective is generally subjective. Alternatively, the machine learning tool may be trained to know that a short message that includes punctuation and emoticons are is generally subjective. In another embodiment, the machine learning tool may compare the features found in the abstraction to those abstractions previously seen during training to determine whether the short message is subjective or objective.

Moreover, based upon the training the created sentiment model would determine a polarity of the message as positive. For example, the machine learning tool may be trained to know that a short message having pattern of features including a low number of features with punctuation followed by an emoticon is generally positive. Alternatively, the machine learning tool may be trained to know that a short message that includes punctuation and good emoticons are is generally positive. In another embodiment, the machine learning tool may compare the features found in the abstraction to those abstractions previously seen during training to determine whether the short message is positive or negative. It should be noted that the above patterns are only examples and that the machine learning tool may be trained to classify subjectivity and determine a polarity in a number of different ways.

In one embodiment, the machine learning tool may be embodied in the AS 112 in the network 100. In another embodiment, the machine learning tool may be embodied in a separate server within the network 100.

In one embodiment, the sentiment detection can be performed in a hierarchical fashion. Specifically, the sentiment model may be created to first determine whether the short message is subjective or objective from the features provided by the abstraction and then determine a polarity of if the short message is subjective.

For example, the presence or absence of various features may be found in short messages that are subjective. Alternatively, a pattern of the features may be found in short messages that are subjective. Similarly, the presence or absence of various features may be found in short messages that are positive and the presence or absence of different features may be found in short messages that are negative. Alternatively, positive and negative short messages may have their own distinctive pattern of features. Based upon the analysis of the abstraction and its features, the model is trained to classify a short message as subjective or objective and determine a polarity of the short messages that are subjective.

In one embodiment, the sentiment of short messages is used to determine a sentiment of various products or media, such as movies, television shows and music. Providing companies the ability to automatically detect a sentiment of the short messages found on various websites allows companies to determine how the public views their products and services. This can be advantageous for marketing, product development and/or other business goals. As a result, the sentiment detection may be provided as a sentiment detection service to subscribers of the network 100 or on a pay per use basis to users of the network 100. At step 210, the method 200 ends.

Figure 3:
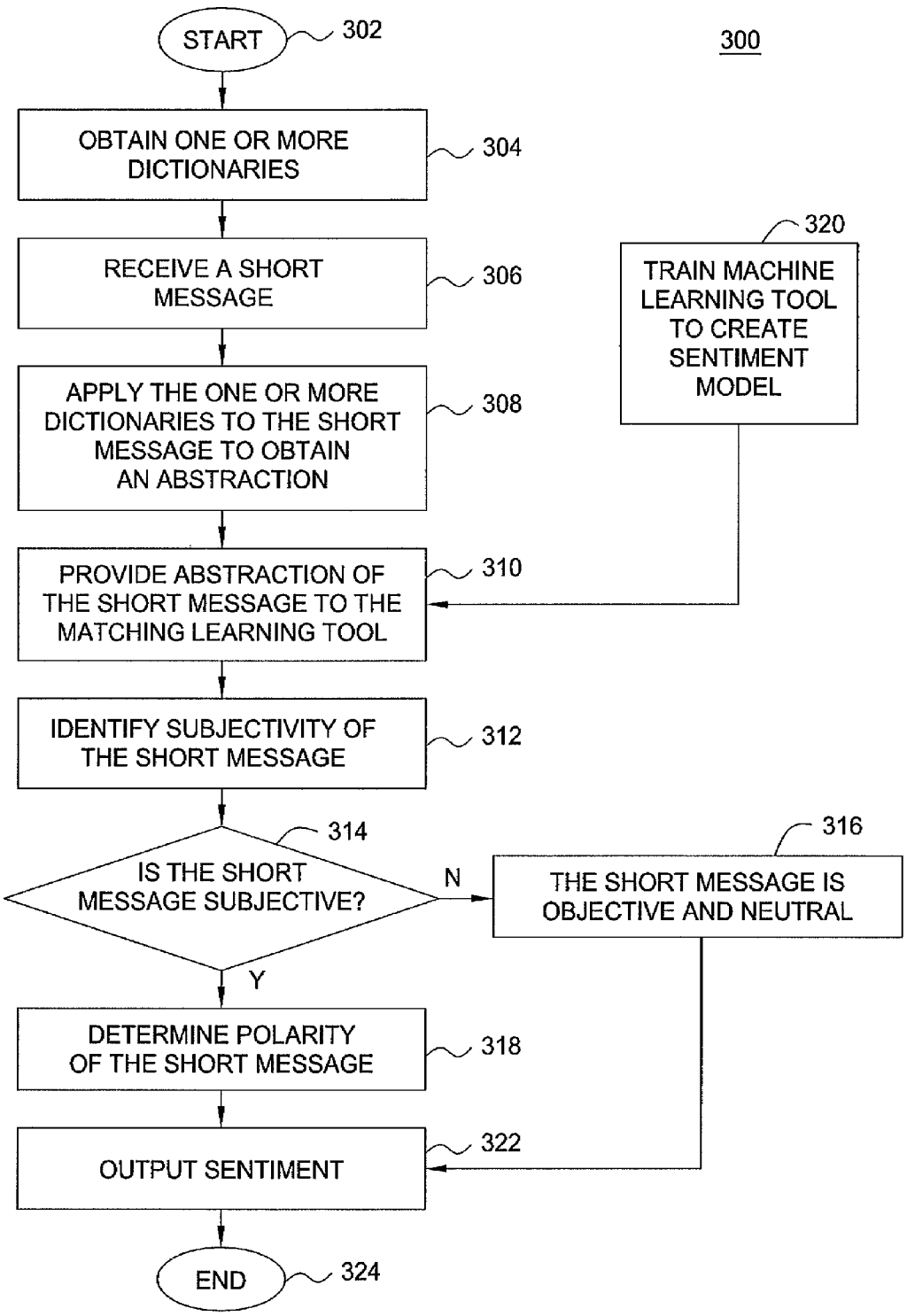
FIG. 3 illustrates a more detailed example flowchart for detecting a sentiment of a short message.

FIG. 3 illustrates a more detailed example of a flowchart of a method 300 for detecting a sentiment of one or more short messages. In one embodiment, the method 300 is implemented by the AS 112 or a general purpose computer having a processor, a memory and input/output devices as discussed below with reference to FIG. 4.

The method 300 begins at step 302 and proceeds to step 304. At step 304, the method 300 obtains one or more dictionaries. For example, various dictionaries readily available via the Internet may be obtained. The various dictionaries may include polarity dictionaries, parts-of-speech dictionaries, punctuation dictionaries and the like.

At step 306, the method 300 receives a short message. In one embodiment, a short message is defined as a message having less than 140 alpha numeric or ASCI based characters. For example, the messages may be "tweets" that are commonly found on social networking websites such as TWITTER® or other types of short messages found on other social network websites such as FACEBOOK® or SMS text messages and the like.

At step 308, the method 300 applies the one or more dictionaries to the short message to obtain an abstraction. For example, the short message can be broken down into various features of the short message by applying the one or more dictionaries. As noted above, the features may include meta-features and syntax features. In one embodiment, meta-features may include, parts-of-speech (e.g., verbs, adjectives, etc.), prior subjectivity and prior polarity. In one embodiment, syntax features may include, for example, are tweets, hashtags, replies, links, punctuation, emoticons (e.g., textual expression representing facial expressions) and upper cases (e.g., the number of words that start with upper case or words in all caps).

At step 310, the method 300 provides the abstraction of the short message to a machine learning tool. It should be noted that the raw text of the short message is not being used by the machine learning tool to determine the sentiment. Rather, the abstraction (e.g., a translation of the short message broken down into its various features such as meta features or syntax features) is provided to the machine learning tool.

In one embodiment, the machine learning tool is previously trained to create a sentiment model. For example, in parallel or before the performance of steps 304-310, the method 300 may perform step 320. At step 320, the method 300 trains the machine learning tool to create the sentiment model. In one embodiment, the machine learning tool can be a currently available tool, for example a Waikato Environment for Knowledge Analysis (WEKA) model. The sentiment model is created by using a large sample of short messages that already have been abstracted based upon features of the short messages and have been labeled with a subjectivity classification and an associated sentiment.

For example, an abstraction of a short message may include four features, for example, one emoticon, one punctuation, one adjective and one noun. It was previously determined that this short message was subjective and that the sentiment of this short message was positive. This sample is fed to the machine learning tool and the machine learning tool is trained to learn based upon this sample. Many more samples (e.g., thousands more) may be fed to the machine learning tool to create the sentiment model. As a result, machine learning tool will use the created sentiment model for subsequent abstractions that are fed to it to determine a sentiment of the short message associated with the abstraction.

Referring back to step 310, the sentiment detection of the abstraction provided to the machine learning tool is performed in a hierarchical fashion as illustrated by steps 312 and 314. At step 312, the method 300 identifies the subjectivity of the short message. The created model determines whether the short message is subjective based upon the features that are found in the abstraction. For example, the presence of some features (e.g., adjectives, punctuation, emoticons, upper case, etc.) in the abstraction have been found in short messages that are subjective. Alternatively, the absence of some features (e.g., adjectives, punctuation, emoticons, upper case, etc.) or the presence of other features (e.g., many nouns) in the abstraction have been found in short messages that are objective.

In addition, during training of the of the machine learning tool during step 320, the sentiment model was created to recognize various patterns of features based upon the thousands of samples used to create the model. The machine learning tool may compare the provided abstraction previously seen abstractions to identify a subjectivity of the short message.

At step 314, the method 300 determines if the short message was subjective. If the message was not subjective, then the method 300 proceeds to step 316, where it is determined that the short message is objective and that the polarity of the short message is neutral. Therefore, the sentiment of the short message is neutral. The method 300 then proceeds to step 322 to output the sentiment. The method then ends at step 324.

However, at step 314 if the method 300 determines that the short message was subjective, then the method 300 proceeds to step 318 to determine a polarity of the short message. Similar to the subjectivity classification performed in step 312, the presence or absence of certain features or patterns of the types of features determine whether the short message is positive or negative. For example, the presence of good emoticons, punctuations, prior positive polarity have been found in short messages that were positive. In contrast, the presence of bad emoticons, prior negative polarity have been found in short messages that were negative.

In another embodiment, the pattern of features within the abstraction can also help determine a polarity of the short message. For example, short messages with a positive polarity may be found to be shorter, thereby including less features or a pattern of features, such as one pronoun followed by one adjective followed by one noun followed by one punctuation. In contrast, short messages with a negative polarity may be found to be longer, thereby including more features or a pattern of features such as one pronoun followed by multiple adjectives followed by one noun followed by multiple punctuations. In other words, based upon the features or pattern of features of the abstraction, the sentiment model can determine the polarity of the short message based upon the thousands of samples used to create the model.

At step 322, the method 300 outputs the sentiment. For example, the sentiment may be outputted to a database or a memory for storage or outputted to a display to a user for viewing. The method ends at step 324.

It should be noted that although not explicitly specified, one or more steps of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIGS. 2 and 3 that recite a determining operation, or involve a decision, do not necessarily require that both branches of the determining operation be practiced. In other words, one of the branches of the determining operation can be deemed as an optional step.

Figure 4:
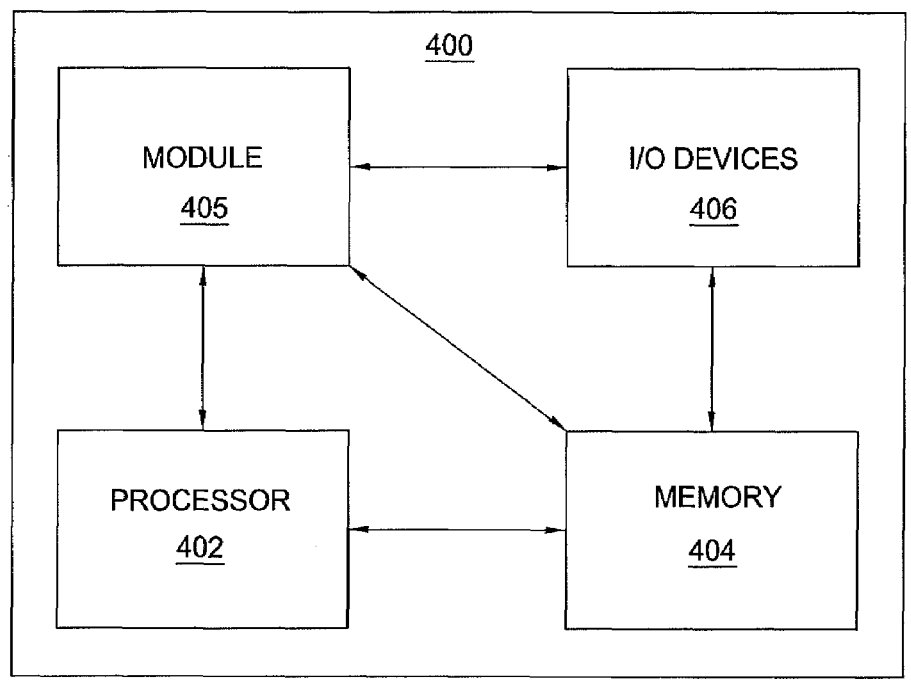
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for detecting a sentiment of one or more short messages, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for detecting a sentiment of one or more short messages can be loaded into memory 404 and executed by processor 402 to implement the functions as discussed above. As such, the present method 405 detecting a sentiment of short messages (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a sentiment for a short message, comprising:
receiving, via a processor, the short message, wherein the short message contains less than 140 characters;
obtaining, via the processor, an abstraction of the short message, wherein the obtaining the abstraction of the short message comprises translating the short message into a plurality of features of the short message, wherein the plurality of features comprises syntax features, wherein the syntax features comprise a punctuation feature and an upper case feature; and
determining, via the processor, the sentiment of the short message based upon the abstraction, wherein the determining the sentiment of the short message is performed in a hierarchical fashion, wherein the determining the sentiment of the short message comprises:
identifying if the short message is subjective based upon the abstraction; and
identifying a polarity of the short message based upon the abstraction when the short message is subjective.

2. The method of claim 1, wherein the plurality of features further comprises meta-features.

3. The method of claim 1, wherein the translating is performed by applying a dictionary.

4. The method of claim 1, wherein the determining the sentiment of the short message further comprises providing the abstraction to a machine learning tool that applies a created sentiment model.

5. The method of claim 1, wherein the sentiment comprises a positive sentiment, a negative sentiment or a neutral sentiment.

6. The method of claim 1, further comprising:
outputting the sentiment.

7. A non-transitory computer-readable medium storing a plurality of instructions which, when executed by a processor, cause the processor to perform operations for detecting a sentiment for a short message, the operations comprising:
receiving the short message, wherein the short message contains less than 140 characters;
obtaining an abstraction of the short message, wherein the obtaining the abstraction of the short message comprises translating the short message into a plurality of features of the short message, wherein the plurality of features comprises syntax features, wherein the syntax features comprise a punctuation feature and an upper case feature; and
determining the sentiment of the short message based upon the abstraction, wherein the determining the sentiment of the short message is performed in a hierarchical fashion, wherein the determining the sentiment of the short message comprises:
identifying if the short message is subjective based upon the abstraction; and
identifying a polarity of the short message based upon the abstraction when the short message is subjective.

8. The non-transitory computer-readable medium of claim 7, wherein the plurality of features further comprises meta-features.

9. The non-transitory computer-readable medium of claim 7, wherein the translating is performed by applying a dictionary.

10. An apparatus for detecting a sentiment for a short message, comprising:

a processor; and a computer readable medium storing a plurality of instructions which, when executed by the processor, cause the processor to perform operations, the operations comprising:

receiving the short message, wherein the short message contains less than 140 characters;

obtaining an abstraction of the short message, wherein the obtaining the abstraction of the short message comprises translating the short message into a plurality of features of the short message, wherein the plurality of features comprises syntax features, wherein the syntax features comprise a punctuation feature and an upper case feature; and determining the sentiment of the short message based upon the abstraction, wherein the determining the sentiment of the short message is performed in a hierarchical fashion, wherein the determining the sentiment of the short message comprises:

identifying if the short message is subjective based upon the abstraction; and identifying a polarity of the short message based upon the abstraction when the short message is subjective.

* * * * *